(12) United States Patent
Haefner et al.

(10) Patent No.: US 12,304,432 B2
(45) Date of Patent: May 20, 2025

(54) WIND DEFLECTOR FOR A WINDSCREEN WIPER SYSTEM OF A MOTOR VEHICLE

(71) Applicants: AUDI AG, Ingolstadt (DE); DR. ING. H.C.F. PORSCHE AG, Stuttgart (DE); A.RAYMOND ET CIE, Grenoble (FR); VOLKSWAGEN AKTIENGESELLSCHAFT, Wolfsburg (DE)

(72) Inventors: Stephan Haefner, Prebitz (DE); Frank Ackermann, Koenigslutter am Elm (DE); Sven Auch, Stuttgart (DE); Axel Feger, Loerrach (DE); Karl Bode, Loerrach (DE)

(73) Assignees: Audi AG, Ingolstadt (DE); Dr. Ing. H.C.F. Porsche AG, Stuttgart (DE); A.Raymond Et Cie, Grenoble (FR); Volkswagen Aktiengesellschaft, Wolfsburg (DE)

( * ) Notice: Subject to any disclaimer, the term of this patent is extended or adjusted under 35 U.S.C. 154(b) by 276 days.

(21) Appl. No.: 17/604,475

(22) PCT Filed: Apr. 14, 2020

(86) PCT No.: PCT/EP2020/060426
§ 371 (c)(1),
(2) Date: Oct. 18, 2021

(87) PCT Pub. No.: WO2020/212327
PCT Pub. Date: Oct. 22, 2020

(65) Prior Publication Data
US 2023/0356695 A1    Nov. 9, 2023

(30) Foreign Application Priority Data
Apr. 16, 2019 (DE) .......................... 102019110082.8

(51) Int. Cl.
*B60S 1/04* (2006.01)
*B60S 1/34* (2006.01)
*B60S 1/52* (2006.01)

(52) U.S. Cl.
CPC ........... *B60S 1/0408* (2013.01); *B60S 1/3415* (2013.01); *B60S 1/522* (2013.01)

(58) Field of Classification Search
CPC .... B60S 1/0408; B60S 1/3415; B60S 1/3806; B60S 1/3479; B60S 1/3463; B60S 1/381; B60S 1/522
(Continued)

(56) References Cited

U.S. PATENT DOCUMENTS 2,799,887 A * 7/1957 Nemic ................ B60Q 1/2684
15/250.201
3,793,666 A * 2/1974 Brillenburg Wurth ......................
B60S 1/522
15/250.04

(Continued)

FOREIGN PATENT DOCUMENTS

CN       108749771 A    11/2018
DE         7401160 U     5/1974
(Continued)

*Primary Examiner* — Gary K. Graham
(74) *Attorney, Agent, or Firm* — Laurence A. Greenberg; Werner H. Stemer; Ralph E. Locher (57) ABSTRACT

A wind deflector for a windscreen wiper system of a motor vehicle has a receptacle for fastening the wind deflector to a component of a wiper arm of the windscreen wiper system. The wind deflector has at least two parts which can be mounted in a divided state on the component of the wiper arm and subsequently can be joined together, as a result of which the wind deflector can be secured to the component of the wiper arm of the windscreen wiper system.

17 Claims, 7 Drawing Sheets

(58) Field of Classification Search
USPC .................................................. 15/250.201
See application file for complete search history.

(56) References Cited

U.S. PATENT DOCUMENTS

| | | | |
|---|---|---|---|
| 4,782,547 A | 11/1988 | Mohnach | |
| 4,989,290 A * | 2/1991 | Hoshino | B60S 1/0408 |
| | | | 15/250.201 |
| 5,842,251 A * | 12/1998 | LeFrançois | B60S 1/3497 |
| | | | 15/250.04 |
| 5,894,626 A * | 4/1999 | Edele | B60S 1/32 |
| | | | 15/250.04 |
| 8,544,136 B2 | 10/2013 | Kraemer et al. | |
| 10,077,028 B2 * | 9/2018 | Ernst | B60S 1/3429 |
| 10,759,390 B2 | 9/2020 | Rapp et al. | |
| 2004/0098821 A1 * | 5/2004 | Kraemer | B60S 1/381 |
| | | | 15/250.43 |

FOREIGN PATENT DOCUMENTS

| | | | | |
|---|---|---|---|---|
| DE | 8716154 U1 | 1/1988 | | |
| DE | 4032256 A1 * | 4/1992 | | |
| DE | 10000382 A1 | 9/2001 | | |
| DE | 102015224620 A1 | 6/2017 | | |
| EP | 0565437 A1 | 10/1993 | | |
| EP | 1385722 A1 | 2/2004 | | |
| FR | 2109141 A5 | 5/1972 | | |
| FR | 3086618 B1 * | 11/2021 | ............ | B60S 1/0408 |
| KR | 19980018628 U | 7/1998 | | |
| WO | WO-9221537 A1 * | 12/1992 | ............ | B60S 1/3415 |

\* cited by examiner

WIND DEFLECTOR FOR A WINDSCREEN WIPER SYSTEM OF A MOTOR VEHICLE

FIELD AND BACKGROUND OF THE INVENTION

The invention relates to a wind deflector or the like functional element for a windscreen wiper system of a motor vehicle. The wind deflector has a receptacle for attaching the wind deflector to a component of a wiper arm of the windscreen wiper system.

From DE 87 16 154 U1, an add-on device for a windscreen wiper is already known, which has a wind deflecting function. The add-on device is manufactured from a plastic in an extrusion molding method and includes a receptacle for attaching a wiper rod of a wiper arm of the windscreen wiper system. In addition, the add-on device includes a receptacle for a hose of a windscreen washer system.

SUMMARY OF THE INVENTION

It is the object of the present invention to provide a wind deflector or the like functional element of the initially mentioned type, which can be particularly beneficially attached to the corresponding wiper arm of the windscreen wiper system.

According to the invention, this object is solved by a wind deflector or the like functional element having the features as claimed. Advantageous configurations of the invention are the subject matter of the dependent claims.

The wind deflector according to the invention or the like functional element is characterized in that a receptacle for attaching to a component, in particular a wiper rod, of a wiper arm of the windscreen wiper system is provided. In order to herein provide a wind deflector, which can be particularly beneficially attached to the component, in particular the wiper rod, of the wiper arm, it is provided according to the invention that the wind deflector includes at least two parts, which can be mounted on the component of the wiper arm in divided state and joined together, whereby the wind deflector can be arranged on the component of the wiper arm of the windscreen wiper system. Thus, it is provided according to the invention to configure the wind deflector or the functional element in multi-part manner and to mount and fix the multiple parts to the component, in particular the wiper rod, of the wiper arm by joining. For example, this has the advantage that the wiper rod or a different component of the wiper arm does not have to have a constant and rectilinear extension, but that the wind deflector can for example also be arranged in a bend area of the wiper rod. In addition, there arises the possibility of also configuring the receptacle for attaching the wind deflector to the corresponding component, in particular the wiper rod, of the wiper arm of a correspondingly hard plastic component, which in turn allows a very stable and stiff connection of the wind deflector to the wiper arm. Furthermore, such parts of the wind deflector can be extremely simply and inexpensively manufactured.

In further configuration of the invention, it has proven advantageous if the wind deflector can be fixed to the wiper rod of the wiper arm of the windscreen wiper system. Especially the wiper rod allows a particularly beneficial and inexpensive fixing of the wind deflector.

A further advantageous embodiment of the invention provides that the receptacle or the receiving channel, in which the wiper rod or another component of the wiper arm is received, is divided by both parts of the wind deflector. By a suitable separation of the receptacle or the receiving channel, thus, a simple mounting of the wind deflector on the wiper arm can be achieved. Therein, the division of the wind deflector into the at least two parts in particular has the advantage that the wind deflector can extend over a bend area of the wiper rod and still be beneficially mounted on it.

Furthermore, it has proven advantageous if a windscreen cleaning device is integrated in the wind deflector. Hereby, a wind deflector with a corresponding dual function can be provided.

In further configuration of the invention, the windscreen cleaning device is integrated in one of the two parts of the wind deflector. In particular, this has the advantage that components of the windscreen cleaning device carrying cleaning liquid do not have to be also joined together in joining the two parts, which would result in constructional additional effort and could optionally cause tightness problems, respectively. However, it is to be considered as encompassed within the scope of the invention that the windscreen cleaning device could optionally also be provided in both parts of the wind deflector.

It is further advantageous if the two parts of the wind deflector are connected to each other via a film hinge or the like connecting element. Thereby, the two parts can be particularly simply joined together.

A further advantageous embodiment of the invention provides that the two parts of the wind deflector can be connected to each other via an attachment device. Herein, the attachment device acts in the manner of a closure, by which the two parts can be connected to each other in simple manner. Optionally, this attachment device can also be detachably configured to allow a subsequent removal of the wind deflector or the functional element from the wiper arm.

In this context, it has proven further advantageous if, for securing the wind deflector to the component, in particular the wiper rod, of the wiper arm, the attachment device includes corresponding securing means. Thus, in joining the two parts, not only fixing of the wind deflector or the functional element to the corresponding component, in particular the wiper rod, of the wiper arm is achieved, but moreover also an axial movement securement.

Finally, it has proven advantageous if the respective locking elements for connecting the two parts are formed of an elastic plastic component of the wind deflector and if respective securing lugs are formed in a plastic component of the wind deflector. Thus, the locking elements can be connected to each other in simple manner in that they are formed of a respective elastic plastic component, which is required anyway. In contrast, the securing lugs of the hard plastic component ensure a particularly stable securement of the wind deflector to the component or the wiper rod to avoid a movement along this wiper rod or the like.

In the following, embodiments of the invention are described. Hereto, there shows:

BRIEF DESCRIPTION OF THE FIGURES

FIG. 1a-1c respective perspective representations of a mounting sequence of a functional element, which is formed as a wind deflector and includes a windscreen cleaning device, on a wiper rod of a wiper arm of a windscreen wiper system for a motor vehicle according to a first embodiment, wherein

FIG. 2a-2c respective partial perspective representations of the functional element of the first embodiment of the windscreen wiper system, wherein

FIG. 4a, 4b respective perspective views to a functional element attached to the corresponding wiper rod according to a further embodiment, in which the functional element is formed shorter and accordingly does not extend up to the spring case of the wiper arm, wherein

FIG. 5a, 5b respective perspective views of the wiper arm with the functional element mounted thereon according to FIGS. 4a and 4b, wherein

FIG. 6a, 6b respective perspective views to a functional element attached to the corresponding wiper rod according to a further embodiment, in which the functional element is formed of two parts, which are connected to each other at a film hinge or the like and can be connected to each other and attached to the wiper rod, respectively, by folding, wherein

FIG. 8a-8c respective sectional views through the functional element according to FIGS. 6a to 7, wherein FIG. 8a shows the two parts of the functional element in opened state analogously to FIG. 6a, FIG. 8b shows the functional element with the two parts in position arranged on the wiper rod, but not yet closed.

DETAILED DESCRIPTION OF THE INVENTION

The embodiments explained in the following are preferred embodiments of the invention. In the embodiments, the described components of the embodiments each represent individual features of the invention to be considered independently of each other, which also each develop the invention independently of each other. Therefore, the disclosure also is to encompass combinations of the features of the embodiments other than the illustrated ones. Furthermore, the described embodiments can also be supplemented by further ones of the already described features of the invention.

In the figures, identical reference characters each denote functionally identical elements.

Figure 1A:
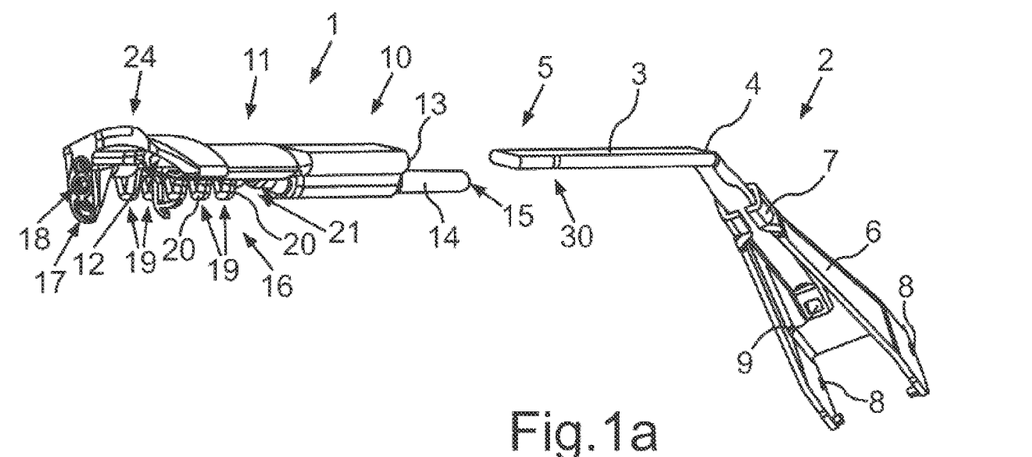
FIG. 1a shows the functional element still separate from the wiper rod.
Figures 1B, 1C:
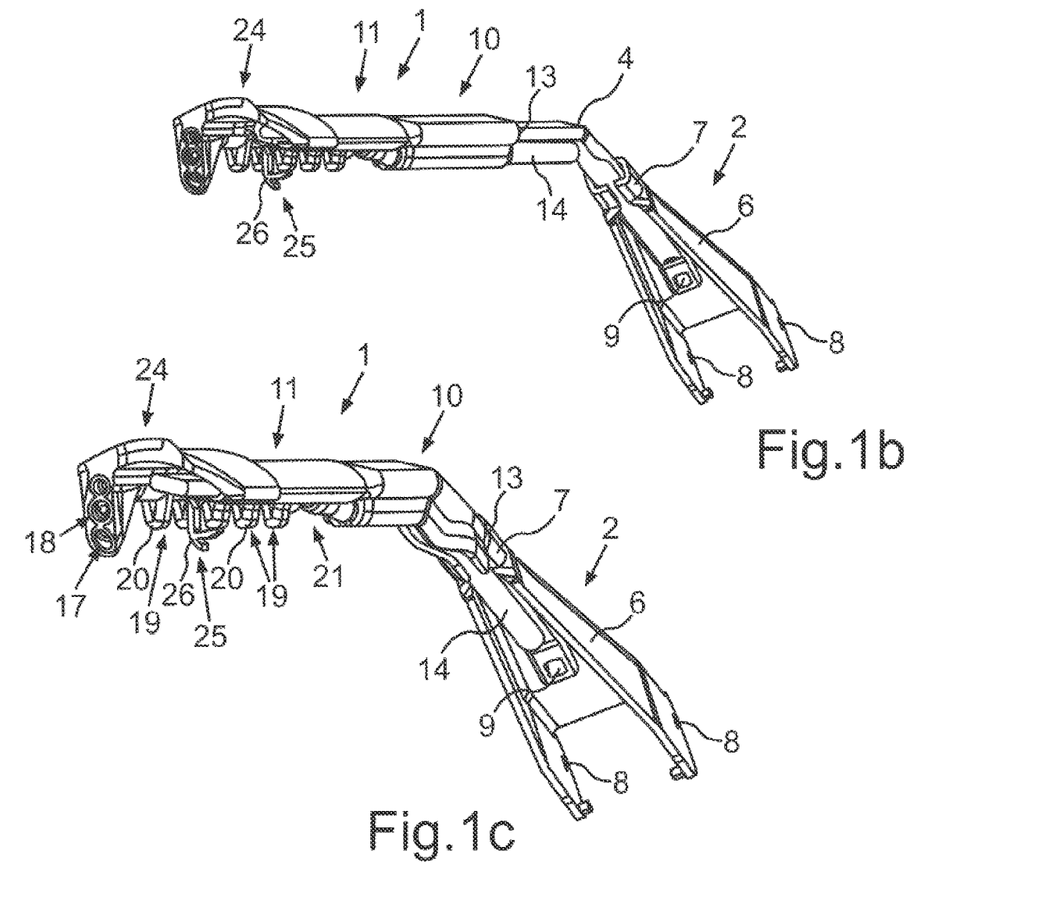
FIG. 1b shows the functional element in partially fitted position on the wiper rod.
FIG. 1c illustrates the functional element completely fitted onto the wiper rod.

FIGS. 1a, 1b and 1c show a mounting sequence for arranging and fixing a functional element 1, explained in more detail below, to a wiper arm 2 in a respective perspective view. Herein, the wiper arm 2 and the functional element 1 are first illustrated separated in exploded manner in FIG. 1a.

Herein, it is in particular apparent that the wiper arm 2 includes a wiper rod 3, which is angularly formed in a bend area 4. The wiper rod 3 is fixedly connected to a spring case 6 on a side opposite to a free end 5, which is at least substantially rectangularly formed in cross-section in a connection area 7 and crimped onto the wiper rod 3 also at least substantially rectangular in cross-section. The spring case 6 is connected to a lever element, not illustrated, of the windscreen wiper system in articulated manner via bearing openings 8, which is occasionally also referred to as attachment part, which in turn is rotationally fixedly connected to an associated drive shaft of a drive motor. The wiper arm is pivotable around the axis formed by the bearing pins 8 with respect to the associated lever element against the spring force of a spring element, which in turn can be hooked in a spring receptacle 9 at the corresponding end of the wiper rod 3, for example to press the wiper arm 2 and an associated wiper blade, respectively, against the surface of a front windscreen in the operating position.

The functional element 1 comprises a first partial area 10 and a second partial area 11 formed integrally with it, within which a continuous receiving channel 12 for the wiper rod 3 is provided. Therein, the receiving channel 12 is at least substantially adapted in cross-section to the approximately rectangular cross-section of the wiper rod 3, which has an at least substantially uniform cross-section over its entire extension. Accordingly, the receiving channel 12 also has a substantially uniform cross-section over its entire length within the functional element 1.

As is further apparent in synopsis with the FIGS. 1b and 1c, the functional element 1 can accordingly be fitted or shifted onto the wiper rod 3 from the free end 5 until an end 13 of the first partial area 10 of the functional element 1 joins to the connection area 7 of the spring case 6 in at least substantially flush manner. In order that fitting of the functional element 1 onto the wiper rod 3 up to the spring case 6 can be effected, the functional element 1 is manufactured of an elastic material, for example a corresponding plastic, in the first partial area 10—starting from the end 13—at least over the bend area 4. By this soft-elastic material, it is optionally also conceivable that the connection area 7 of the spring case 6 is surmounted by the end 13 of the partial area 10 of the functional element 1 in sleeve-like manner.

In addition, the end 13 of the partial area 10 is surmounted by a conduit part 14, via which the functional element 1 can be supplied with a windscreen cleaning liquid in a manner described in more detail below. Accordingly, at least one supply channel 15 for windscreen cleaning liquid is formed within the conduit part 14, via which the functional element 1 can be supplied with windscreen cleaning liquid in a manner described in more detail below. This supply channel 15 further extends also over the partial area 10 as well as over the partial area 11 of the functional element 1. Accordingly, a windscreen cleaning device 16 or a part of it is formed in the functional element 1 such that the wiper arm 2 is a so-called wet wiper arm in the present case. This means that the windscreen to be cleaned by means of the windscreen wiper system, in particular the front windscreen of the motor vehicle, can be supplied with windscreen cleaning liquid via nozzles, which are carried by the wiper arm 2. Therein, the end of the conduit part 14 of the functional element 1 is connected to the windscreen cleaning system for windscreen cleaning liquid along with associated pump via a channel arrangement not further shown. Usually, it is accommodated in the front space or engine compartment of the motor vehicle. As is in particular apparent from FIG. 1*c*, the conduit part 14 extends on the bottom side of the wiper rod 3 further up to the interior of the spring case 6 in the present case.

In synopsis of the FIGS. 1*a* to 1*c*, it is furthermore apparent that shifting the functional element 1 onto the wiper rod 3 is effected until it—as is apparent from FIG. 1*c* in the finally mounted position of the functional element 1—protrudes from the receiving channel 12 over a substantial length area at a free end 5. Inversely, this means that the functional element 1 with the partial areas 10, 11 is connected to a length area of the wiper rod 3 spaced from the free end 5 of the wiper rod 3 via the receiving channel 12.

In other words, the free end 5 protrudes beyond the partial area 11 of the functional element 1 and from the receiving channel 12, respectively.

The windscreen cleaning device 16 integrated in the functional element 1 presently includes a channel system with respective channels integrated in the functional element 1, which open into diverse nozzles, via which the windscreen to be cleaned and to be wiped, respectively, and the wiper blade explained in more detail below, respectively, can be supplied with windscreen cleaning liquid.

Thus, the windscreen cleaning device 16 first includes two outer circle nozzles 17, 18, via which the wiper blade is supplied in the near area of its outer circle, thus that area, in which the wiper blade traverses the largest radius of its surface to be wiped. Therein, the outer circle nozzle 17 covers an area closer to the functional element 1 and the outer circle nozzle 18 covers an area further away from the functional element 1 near the outer circle of the corresponding wiper blade.

In addition, the windscreen cleaning device 16 includes a plurality of presently five central nozzles 19, which all extend at least substantially in a row along the extension direction of the functional element 1. The respective nozzles 19 are accommodated in respectively associated protrusions 20 protruding from the functional element 1 and from the wiper arm 2, respectively, towards the windscreen to be wiped and to be cleaned in a manner described below. Finally, the windscreen cleaning device 16 includes at least one inner circle nozzle 21, via which the wiper blade of the wiper arm 2 is supplied with cleaning liquid in the area of its inner circle, in which the wiper blade traverses its shortest radius of the corresponding wiping surface in the wiping operation. Therein, all of the nozzles 17, 18, 19 and 21 can be adjusted such that they apply the cleaning liquid to the windscreen, in particular the front windscreen, at a corresponding distance in front of the wiper blade moving thereto upon a start movement, thus upon an upwards movement of the respective wiper arm 2 in case of a front windscreen. Optionally, the wiper blade can also be immediately supplied with the windscreen cleaning liquid.

Besides the integration of the windscreen cleaning device 16, the functional element 1 includes the further function of wind deflection. Accordingly, the functional element 1 is formed as a wind deflector 22 in the present case and includes a wind deflecting contour 23 on the front and top side, respectively, at least substantially facing away from the nozzles 19 as well as the wiper rod 3 to accordingly allow a particularly beneficial overflow of the air usually flowing to the respective wiper arm 2 and the corresponding wiper blade, respectively, from the front.

Thus, the present functional element 1 is formed as a wind deflector 22 and for integration of the windscreen cleaning device 16. However, it is to be considered as encompassed within the scope of the invention that the functional element 1 could also perform only one of these two functions.

Figure 2A:
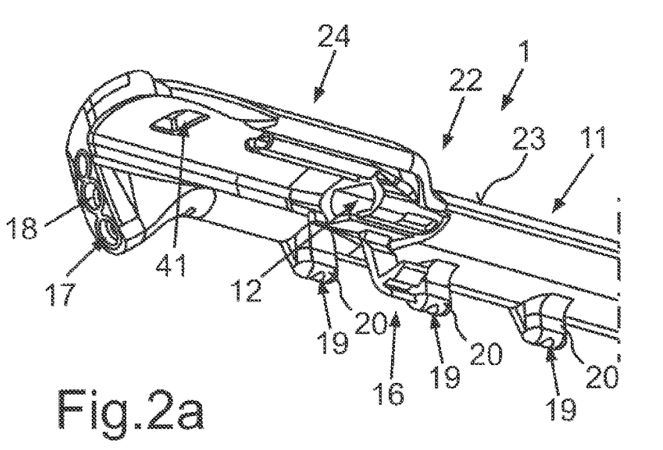
FIG. 2a shows the functional element before fitting onto the wiper rod.
Figure 2B:
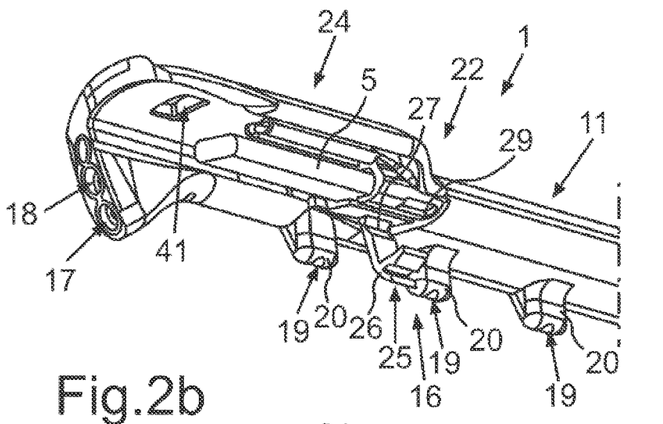
FIG. 2b shows the functional element in completely fitted position, but not yet secured by means of an attachment device.
Figure 2C:
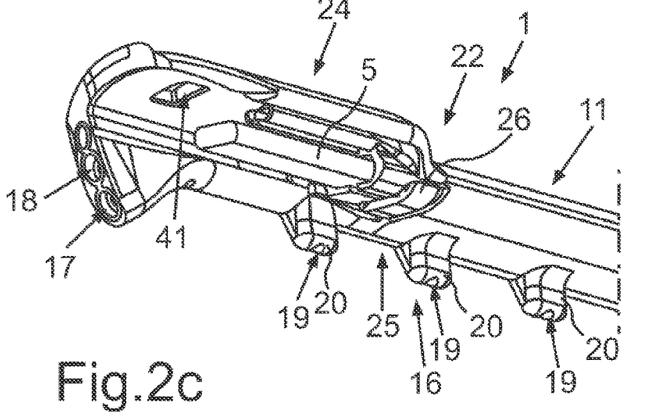
FIG. 2c illustrates the functional element subsequently fixed to the wiper rod by means of the attachment device.

The FIGS. 2*a* to 2*c* show the functional element 1 of the embodiment described in the FIGS. 1*a* to 1*c* in respective partial and perspective bottom views. Therein, the receiving channel for the wiper rod 3 is in particular apparent from FIG. 2*a*, which from a third partial area 24 of the functional element 1, which is also formed integrally with the partial areas 10 and 11. Therein, the FIGS. 2*b* and 2*c* show the position of the functional element 1 when it is completely fitted onto the wiper rod 3. In this position, the third partial area 24 of the functional element 1 covers the free end 5 of the wiper rod 3, in particular at the front side thereof and on the bottom side thereof-related to the installation position of the wiper arm 2. Further, it is apparent that the wiper rod 3 is arranged recessed with respect to the partial area 24.

Based on a synopsis of the FIGS. 2*a* and 2*b* with that according to FIG. 2*c*, it is additionally apparent that the functional element 1 is arranged secured to the wiper rod 3 of the wiper arm 2 in extension direction of the receiving channel 12 by means of an attachment device 25 in the present case. In the present case, the securement is effected by means of a flap 26, which is pivotably arranged on the functional element 1 via a film hinge 27. If the flap 26 is inserted by means of a locking element 28 into a locking receptacle 29 provided hereto in the area of the receiving channel 12, thus, the locking element 28 also engages with a groove 30 (FIG. 1*a*) within the wiper rod 3. Hereby, an axial securement of the functional element 1 on the wiper rod virtually results such that the functional element 1 is correspondingly secured in position after shifting onto the wiper rod 3.

Figure 3A:
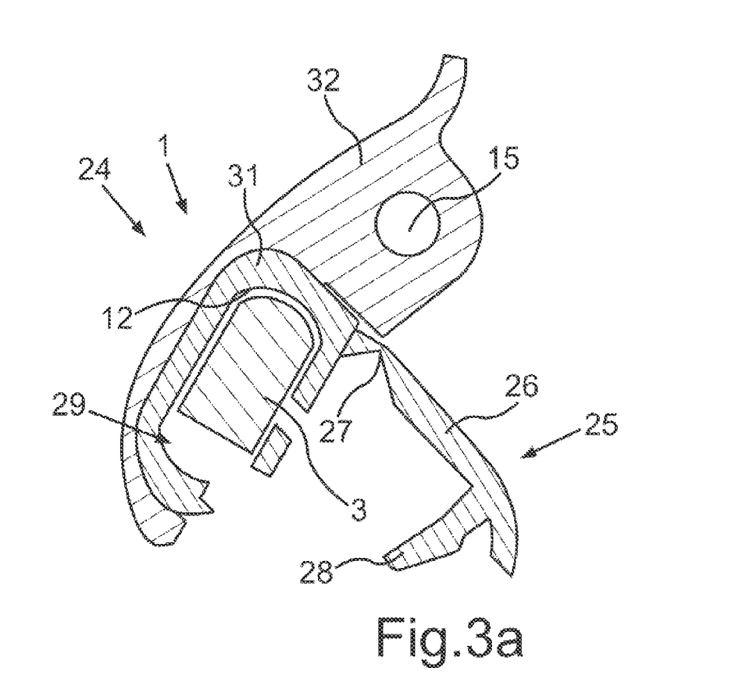
FIG. 3a, 3b respective sectional views through the functional element in its position arranged on the wiper rod, wherein in FIG. 3a the attachment device for fixing the functional element to the wiper rod is illustrated in opened state and in FIG. 3b the attachment device is illustrated in closed position fixing the functional element to the wiper rod.
Figure 3B:
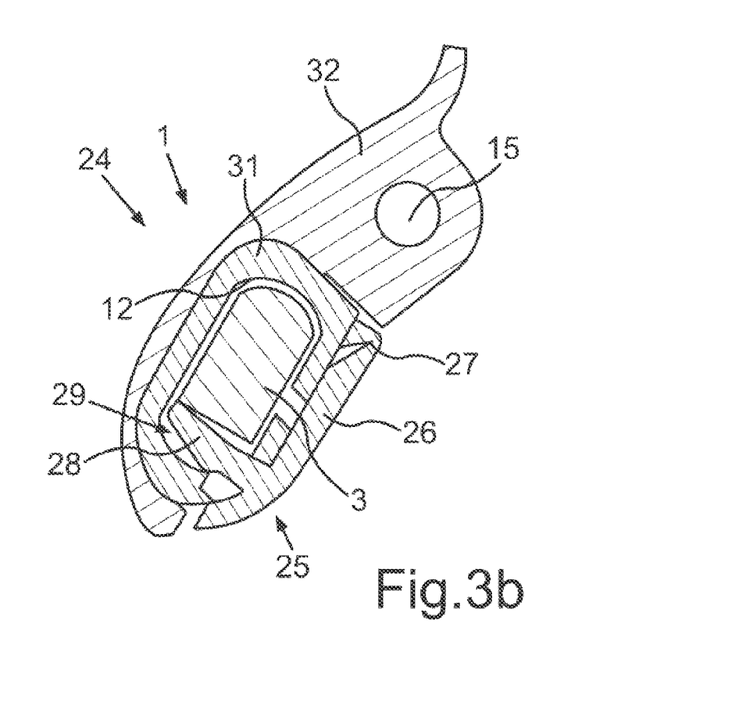

In the FIGS. 3*a* and 3*b*, the attachment device 25 is again explained in its functionality in a respective sectional view of the arrangement of the functional element 1 on the wiper rod 3. Herein, it is in particular apparent how the axial securement of the locking element 28 on the side of the flap 26 within the locking receptacle 29 or at the groove 30 of the wiper rod 3 results.

Based on the different hatchings, it additionally becomes clear from the FIGS. 3*a* and 3*b* that the functional element 1 is presently manufactured as a plastic part in a two-component method, for example a two-component injection molding method. Herein, it is in particular apparent that the receiving channel 12 is formed by a hard component 31 in the area of the attachment device 25. Similarly, the respective channels carrying the cleaning liquid in the second and third partial areas 11, 24 of the functional element 1 are formed of this hard component 31 at least in the area of the respective nozzles 17, 18, 19, 21. Therebetween, parts can also be formed by a soft component 32 of the plastic, which incidentally also form the first partial area 10 and the conduit part 14—as already explained. The wind deflector contour 23 of the functional element 1 is also formed by the soft component 32—as it is apparent from the FIGS. 3*a* and 3*b*. Therein, the components 31, 32 are in particular formed UV-resistant to be correspondingly permanently durable.

Figure 4A:
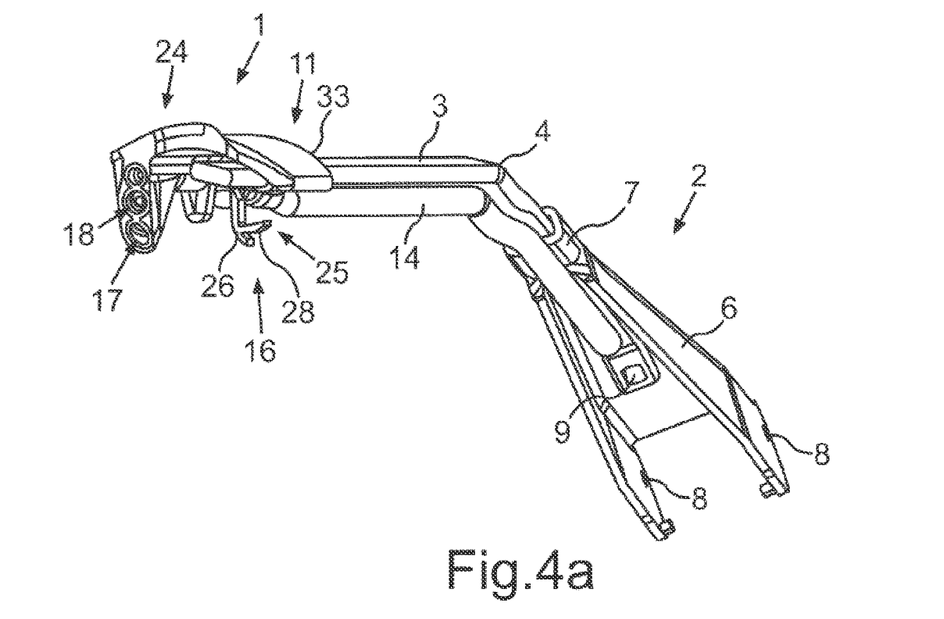
FIG. 4a shows the functional element with an opened attachment device and FIG. 4b with a closed attachment device.
Figure 4B:
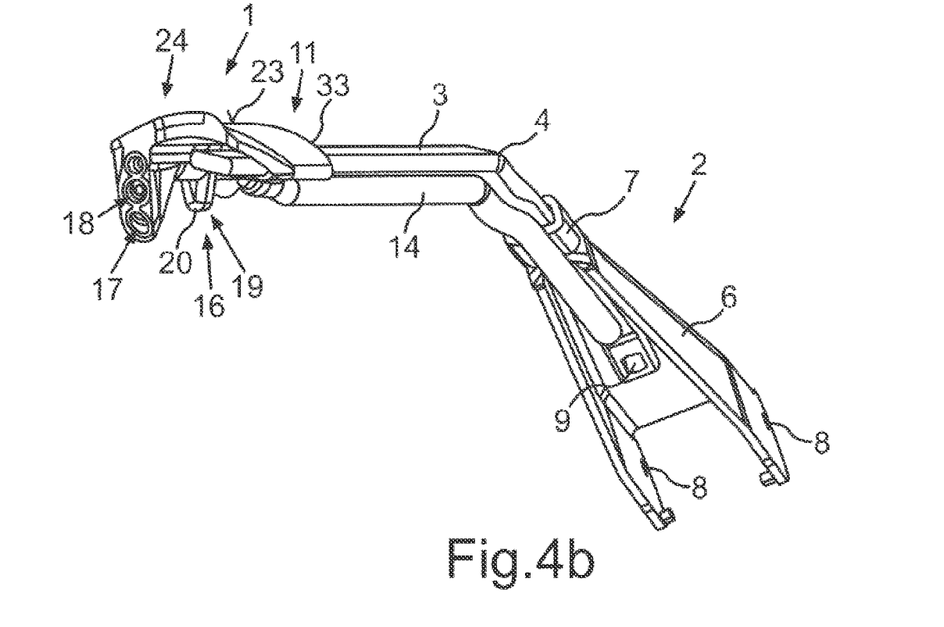

In the FIGS. 4*a* and 4*b*, an alternative embodiment of the functional element 1 is illustrated in a respective perspective view. This functional element 1 is substantially identical to that according to the first described embodiment in its configuration and function such that only the differences are to be addressed below. This functional element 1 substantially differs in that in it the first partial area 10 of the functional element 1, which extends between the second partial area 11 and the connection area 7 of the spring case 6, is not provided here. Rather, the functional element 1 terminates with an end 33 at a distance before the bend area 4 and accordingly at a substantial distance before the connection area 7 of the spring case 6. The conduit part 14 of the functional element 1 accordingly extends over a substantial length without additional sheathing of the wiper rod 3 below or inside it up into the spring case 6, from where the further connection for supply with the cleaning liquid is effected.

Depending on how shortly the functional element 1 is formed, one or multiple respective inner circle nozzles 21 can optionally be omitted in some embodiments. Such a configuration for example arises in vehicles of the compact class, in which a relatively low windscreen surface has to be wiped and cleaned, respectively. On a respective passenger's side of a larger windscreen too, such a concept optionally also offers itself. Incidentally, the windscreen cleaning device 16 integrated in the functional element 1 has a configuration at least substantially identical to the embodiment already described in context of the FIGS. 1a to 3b. However-according to length of the functional element 1 and in particular of the partial areas 11 and 24, respectively-a lower number of central nozzles 19 can be provided. In the present embodiment too, the locking element 28 is again apparent, by means of which the functional element 1 can be secured after fitting onto the wiper rod 3.

Figure 5A:
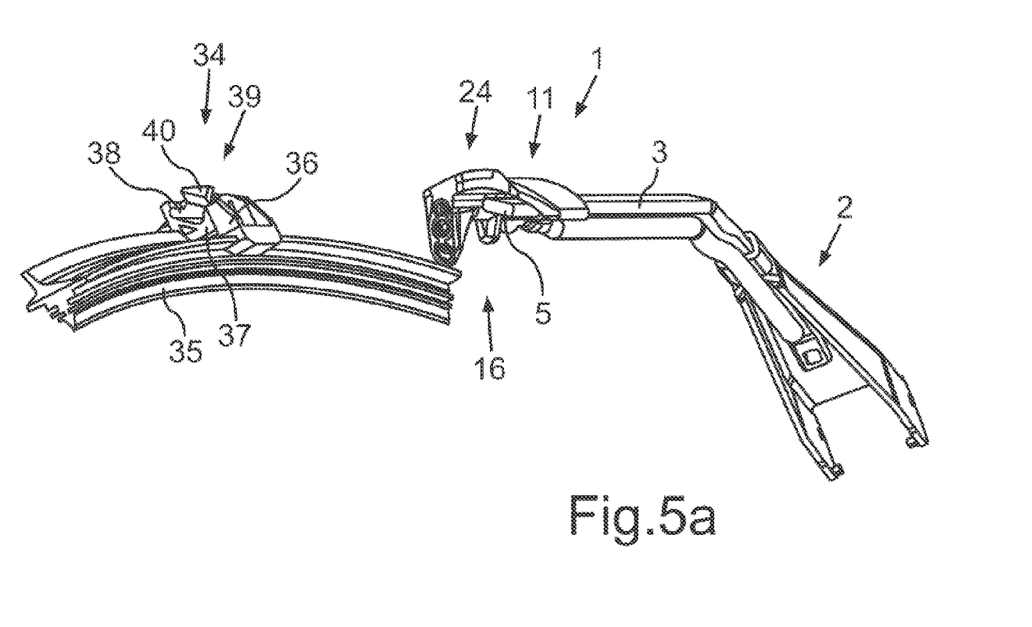
FIG. 5a shows a wiper blade before its mounting and FIG. 5b shows the wiper blade after mounting by means of an adapter, which is arranged on and fixed to the free end of the wiper rod of the wiper arm independently of the functional element.
Figure 5B:
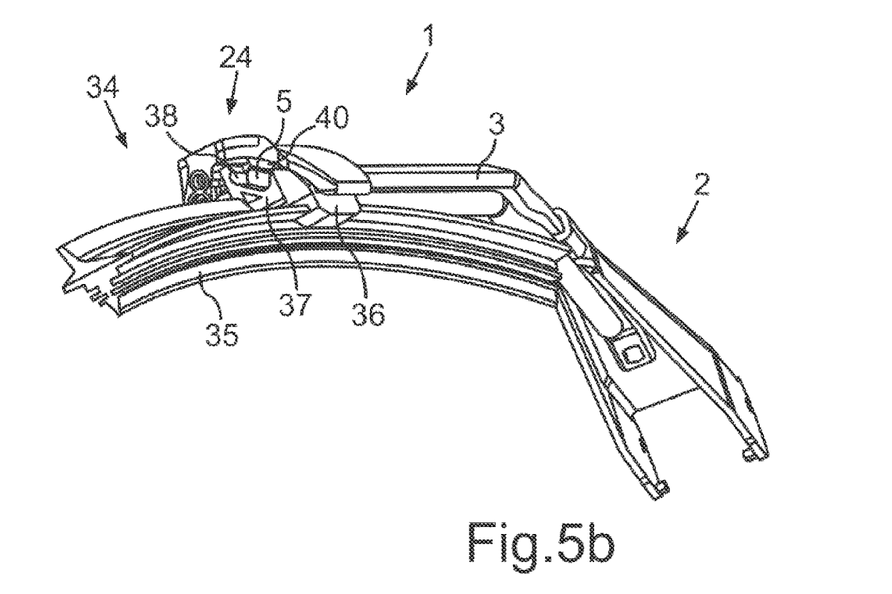

In the FIGS. 5a and 5b, mounting of a wiper blade 34 on the corresponding free end 5 of the wiper rod 3, which protrudes from the receiving channel 12 of the functional element 1, is finally illustrated in a respective perspective view.

Therein, the wiper blade 34 includes a wiper blade element 35, to which a basic body in the form of a slider 36 is attached. This slider 36 is in turn connected to an adapter 37 in articulated manner such that the wiper blade element 35 with the slider 36 can be pivoted relatively to the adapter 37 to a certain extent. The adapter 37 includes a receptacle 38 formed at least partially open in the present case, via which the adapter 37 and thus the entire wiper blade 34, respectively, can be fitted at the free end 5 of the wiper rod 3. Hereto, the receptacle 38, which is formed as a type of plug-in receptacle, is adapted in its cross-section and in its shape, respectively, to the cross-section of the wiper rod 3. After the adapter 37 with the receptacle 38 is fitted onto the free end 5 of the wiper rod 3 over a certain length area, a locking device 39 engages, which includes a corresponding locking element both on the side of the adapter 37 and on the side of the wiper rod 3. This locking device 39 can for example include a locking pin or the like on the side of the adapter 37, which engages with a locking recess on the side of the free end 5 of the wiper rod 3. Therein, the locking device 39 is detachable by means of an actuating element 40 in the form of a push button or the like, which has to be pressed towards the wiper blade element 39 in the present case.

In its locked position, this actuating element 40 penetrates a passage opening 42 within the partial area 24 of the functional element 1. In the locked position of the locking device 39, thus, the actuating element 40 is at least substantially arranged within this passage opening 41 and accordingly can be actuated from the front outside to remove the wiper blade 34 from the free end 5 of the wiper rod 3.

Since the functional element 1 thus is attached to the wiper rod 3 in a length area of it spaced from the free end 5 and the adapter 37 of the wiper blade 34 is attached to the free end 5 of the wiper rod, a completely independent respective arrangement and fixing to the wiper rod 3 results for the functional element 1 and the wiper blade 34. This has the advantage that the wiper blade 34 can be removed and for example exchanged from time to time completely independently of the functional element 1 without this having an influence on the functionality of the functional element 1. Therein, it is in particular to be taken into account that both the wind deflecting function and the windscreen cleaning function of the functional element 1 is completely maintained even if the adapter 37 is removed, but the functional element 1 remains on the wiper rod 3. In contrast to other systems, thus, a part of the wind deflecting device or the windscreen cleaning device is not removed and for example disposed of with the exchange of the wiper blade 34, which creates corresponding financial problems and problems arising with respect to the sustainability. Rather, a system is thus provided, in which the connection of the wiper blade 34 and the connection of the functional element 1 as well as performing the functions accomplished by the functional element are completely autonomous from each other.

Moreover, further elements can be integrated in the functional element 1. In particular, a heating for the windscreen cleaning device can also be integrated. Here too, the advantages already described in context of the windscreen cleaning device arise.

Figure 6A:
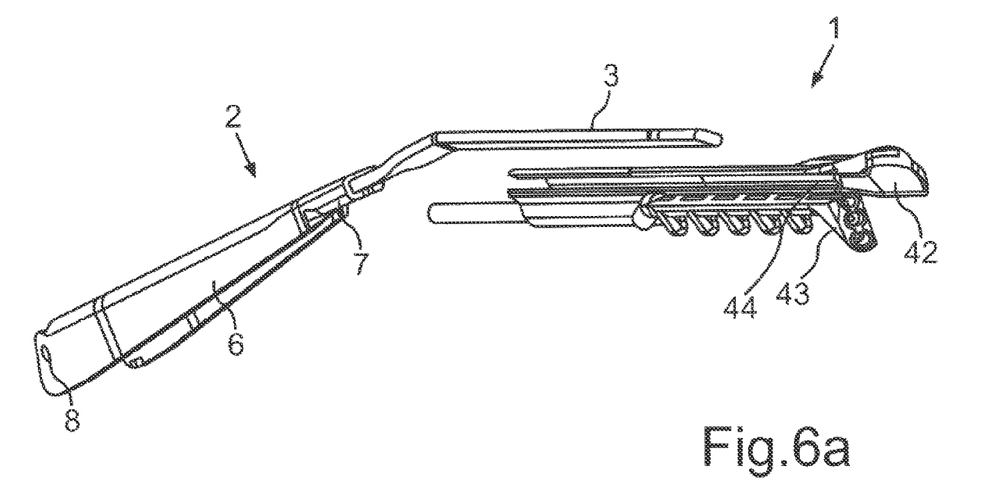
FIG. 6a shows the functional element before fixing to the wiper rod and FIG. 6b shows the functional element after fixing to the wiper rod.
Figure 6B:
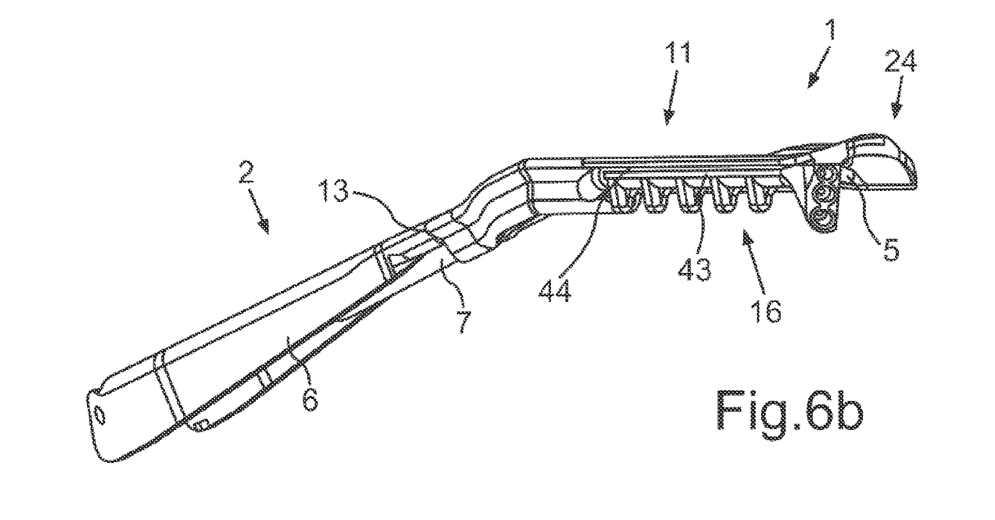

In the FIGS. 6a and 6b, a further, alternative embodiment of the functional element 1 is illustrated in a respective perspective view. This functional element 1 too is substantially identical to that according to the first described embodiment in its configuration and function such that only differences are to be addressed below. This functional element 1 substantially differs in that it is composed of two parts 42, 43, which are integrally connected to each other in the manner of a film hinge. Here, a completely two-part or multi-part variant would optionally also be conceivable.

Figures 8A, 8B:
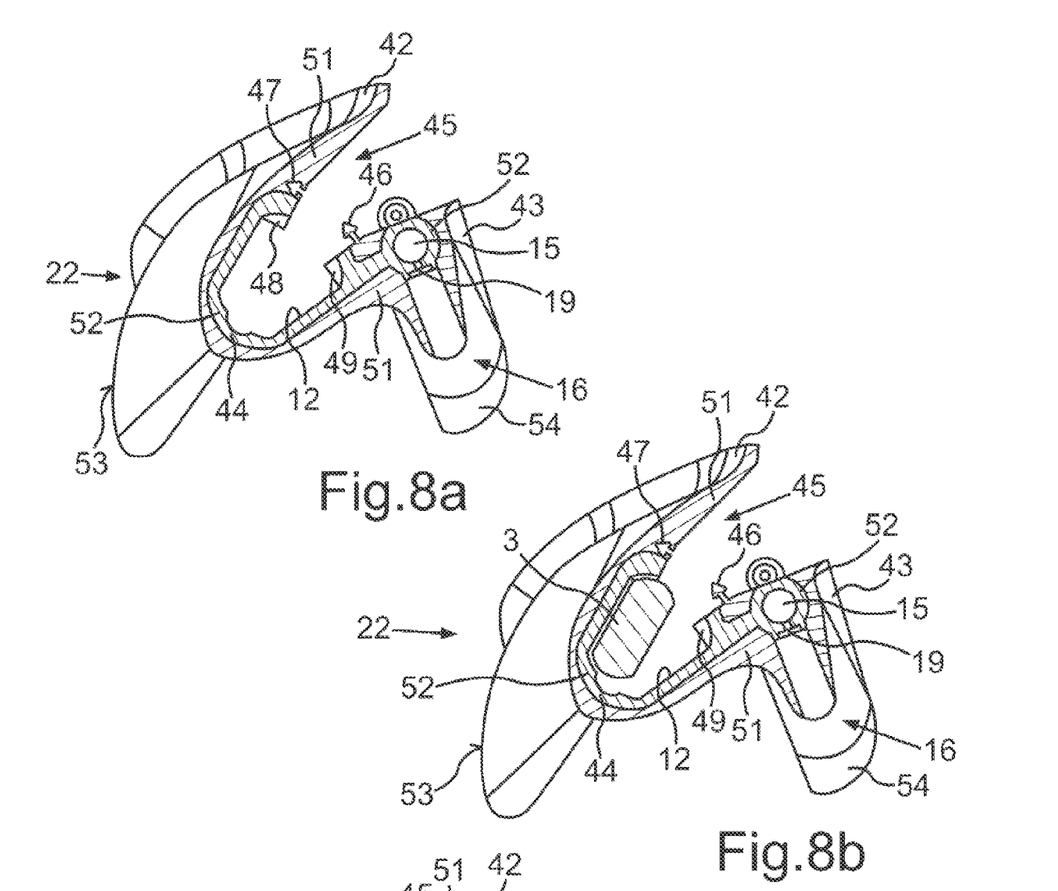
Figure 8C:
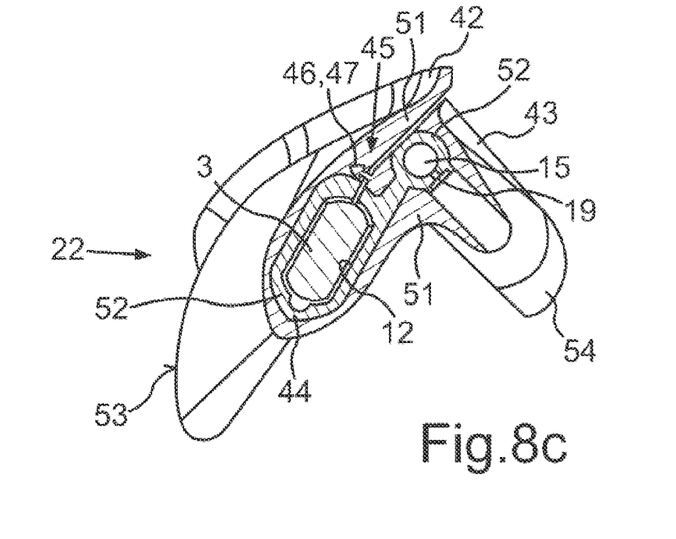
FIG. 8c illustrates the two parts of the functional element after attachment to the wiper rod.

In synopsis with the FIGS. 8a to 8c, which show a respective cross-sectional view through the functional element 1 and the wiper rod 3, respectively, therein, it becomes apparent in which manner the arrangement and fixing of the two parts 42, 43 and of the functional element 1 overall, respectively, to the wiper rod 3 are effected. According to the FIGS. 6a and 8a, respectively, therein, the functional element 1 is shifted and/or fitted onto the wiper rod 3 with opened parts 42, 43 until the wiper rod 3—as it is in particular apparent from FIG. 8b—is arranged in its intended receiving channel 12, which is formed analogously to the receiving channels 12 according to the first two embodiments. In other words, the two parts 42, 43 of the functional element 1 or of the wind deflector 22 can be mounted on the wiper rod 3 of the wiper arm 2 in divided state.

Subsequently thereto, the two parts 42, 43 can then be pivoted against each other around the axis formed by the film hinge 44 or the like and joined together until the parts 42, 43 are connected to each other by means of the attachment device 45 on the side facing away from the film hinge 44 in the present case. Herein, the attachment device 45 includes one or more locking elements 46 at the one part 43, which—as it is in particular apparent from FIG. 8c—engage with each one or more corresponding locking elements in the form of locking receptacles 47. Thus, by joining the two parts 42, 43, the wind deflector 22 is fixed to the component 3 of the wiper arm 2 of the windscreen wiper system.

Figure 7:
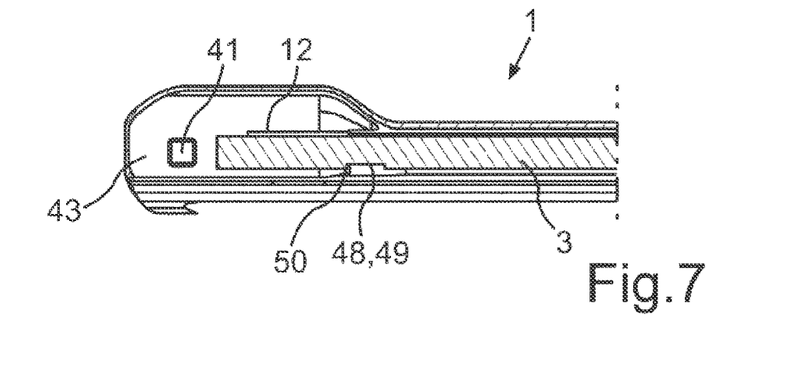
FIG. 7 a partial sectional view through the functional element as well as the associated wiper rod, to which the functional element is attached, along a sectional plane, which extends in a separating plane between the two parts of the functional element, wherein in particular an attachment device becomes apparent, by means of which the functional element is secured to the wiper rod.

In addition, a respective securing lug 48, 49 is arranged at both parts 42, 43, which—as it is apparent from FIG. 7—engage with a groove 50 in the wiper rod 3. The securing lugs 48, 49 thus act as an axial securement of the attachment device 45 in their cooperation with the groove 50 to avoid displacement of the functional element 1 in extension direction of the wiper rod 3.

In the present case, the respective locking elements and locking receptacles 46, 47, respectively, for connecting the two parts 42, 43 are formed in the elastic plastic component 51 of the wind deflector 22. The respective securing lugs 48, for fixing the functional element 1 to the wiper rod 3 are formed in the hard plastic component 52 of the wind deflector 22.

The divided design of this functional element 1 with the parts 42 and 43 offers the advantage that the functional element 1 can be fixed to the wiper rod 3 in simple manner even if the wiper rod 3 for example has a non-rectilinear extension or a bend area 4. Therein, the functional element 1 can extend both up to the spring case 6 and to the connection area 7 thereof, respectively, and terminate at a distance to this connection area 7. Presently, the two parts 42, 43 extend beyond the bend area 4 of the wiper rod 3 up to the spring case 6.

In particular, it is additionally apparent from the FIGS. 8a to 8c that—as in the preceding embodiments—the functional element 1 is formed partially of an elastic plastic component 51 and partially of a hard plastic component 52. In the present case, the receptacle or the receiving channel 12 is formed of the hard plastic component 52 at least in the partial area 11, but for example also in the partial area 10, in the present case, to thus obtain a particularly fixed and secure arrangement of the functional element 1 on the wiper rod 3. In other words, the receptacle or the receiving channel 12 is divided by both parts 42, 43 of the wind deflector 22.

In addition, in the present case, all of the liquid-carrying components of the windscreen cleaning device 16, thus for example the supply channel 15 as well as the respective nozzles 17, 18, 19, 21, are again at least substantially formed of the hard plastic component 52. The components of the windscreen cleaning device 16 carrying the cleaning liquid are thus particularly dimensionally stably and tightly designed. However, the windscreen cleaning device 16 is therein—as it is in particular apparent from the FIGS. 8a to 8c—at least substantially completely integrated in the elastic plastic component 51.

In the present embodiment, the wiper cleaning device 16 is additionally integrated in only one of the two parts 42, 43 of the wind deflector 22. This in particular has advantages with respect to the tightness since components of the two parts 42, 43 carrying cleaning liquid do not have to be connected to each other.

In particular—related to the installation position of the functional element 1 or of the wind deflector 22—a surface 53 on its visible side is at least substantially completely formed by the elastic plastic component 51. Hereby, an optically particularly beneficial impression and moreover a functional element 1 arise, which is particularly well protected from strokes, impacts or the like. Therein, the elastic plastic component 51 is preferably formed of a UV-resistant material to be correspondingly persistent. In addition, the elastic plastic component 51 comprises protrusions 54, which for example serve as dampers to protect the functional element 1 or the wind deflector 22 as well as the surface of the windscreen to be cleaned.

Thus, it is overall apparent that a functional element 1 or a wind deflector 22 is presently provided, which includes at least two parts 42, 43, which can be mounted on the component 3 of the wiper arm 2 in divided state and joined together, whereby the wind deflector 22 can be arranged on the component 3 of the wiper arm 3. For example, this has the advantage that the wiper rod 3 or a different component of the wiper arm 2 does not have to have a constant and rectilinear extension, but that the wind deflector 22 can for example also be arranged in the bend area 4 of the wiper rod 3. In addition, there arises the possibility of also configuring the receptacle or the receiving channel 12 for attaching the wind deflector 22 to the corresponding component, in particular the wiper rod 3, of the wiper arm 2 of the hard plastic component 52, which in turn allows a very stable and stiff connection of the wind deflector 22 to the wiper arm 3.

The invention claimed is:

1. A wind deflector assembly for a windscreen wiper system of a motor vehicle, the windscreen wiper system having a wiper arm and the wiper arm having a wiper rod with a non-rectilinear longitudinal extent forming a bend of the wiper rod, the wind deflector assembly comprising:
   a wind deflector
   a receptacle for attaching said wind deflector to the wiper rod of the wiper arm;
   said wind deflector having at least two parts to be mounted in a divided state and then joined on the wiper rod to affix said wind deflector to the wiper rod of the wiper arm and to affix said wind deflector on the wiper arm of the windscreen wiper system; and
   wherein said wind deflector is configured such that, in a mounted state of said wind deflector, said at least two parts are disposed on said wiper rod and extend over the bend of the wiper rod; and
   a windscreen cleaning device integrated in one of said two parts of said wind deflector, said windscreen cleaning device having a plurality of protrusions projecting from said one of said two parts of said wind deflector and being formed with nozzles for supplying cleaning liquid for cleaning a windscreen.

2. The wind deflector assembly according to claim 1, wherein said receptacle is divided by said two parts of said wind deflector.

3. The wind deflector assembly according to claim 1, wherein said windscreen cleaning device is at least substantially completely integrated in an elastic plastic component of said wind deflector.

4. The wind deflector assembly according to claim 1, wherein said two parts of said wind deflector are connected to one another via a film hinge.

5. The wind deflector assembly according to claim 1, wherein said two parts of said wind deflector are articulated to one another.

6. The wind deflector assembly according to claim 1, further comprising an attachment device for connecting said two parts of said wind deflector to one another.

7. The wind deflector assembly according to claim 6, wherein said attachment device is configured for securing said wind deflector to the wiper rod of the wiper arm of the windscreen wiper system.

8. The wind deflector assembly according to claim 1, wherein said wind deflector is partly formed of an elastic plastic component and partly formed of a hard plastic component, and wherein locking elements for connecting said two parts are formed in said elastic plastic component of said wind deflector and securing lugs are formed in said hard plastic component of said wind deflector.

9. A windscreen wiper assembly for a motor vehicle, the windscreen wiper assembly comprising:

a windscreen wiper system having a wiper arm with a wiper rod, said wiper rod having a non-rectilinear longitudinal extent forming a bend of said wiper rod;

a wind deflector;

a receptacle for attaching said wind deflector to said wiper rod of said wiper arm;

said wind deflector having at least two parts to be mounted in a divided state and then joined on said wiper rod to affix said wind deflector to said wiper rod of the wiper arm and to affix said wind deflector on said wiper arm; and with said wind deflector being mounted and affixed to said wiper rod, said at least two parts being disposed on said wiper rod and extending across said bend of said wiper rod; and a windscreen cleaning device integrated in one of said two parts of said wind deflector, said windscreen cleaning device having a plurality of protrusions projecting from said one of said two parts of said wind deflector towards a windscreen and being formed with nozzles for supplying cleaning liquid for cleaning the windscreen.

10. The windscreen wiper assembly according to claim 9, wherein said receptacle is divided by said two parts of said wind deflector.

11. The windscreen wiper assembly according to claim 9, further comprising a windscreen cleaning device integrated in one of said two parts of said wind deflector.

12. The windscreen wiper assembly according to claim 11, wherein said windscreen cleaning device is at least substantially completely integrated in an elastic plastic component of said wind deflector.

13. The windscreen wiper assembly according to claim 9, wherein said two parts of said wind deflector are connected to one another via a film hinge.

14. The windscreen wiper assembly according to claim 9, wherein said two parts of said wind deflector are articulated to one another.

15. The windscreen wiper assembly according to claim 9, further comprising an attachment device for connecting said two parts of said wind deflector to one another.

16. The windscreen wiper assembly according to claim 15, wherein said attachment device is configured for securing said wind deflector to said wiper rod of said wiper arm.

17. The windscreen wiper assembly according to claim 9, wherein said wind deflector is partly formed of an elastic plastic component and partly formed of a hard plastic component, and wherein locking elements for connecting said two parts are formed in said elastic plastic component of said wind deflector and securing lugs are formed in said hard plastic component of said wind deflector.

\* \* \* \* \*